Feb. 11, 1930.  L. PODSZUS  1,746,361
CARBURETOR
Filed May 5, 1925
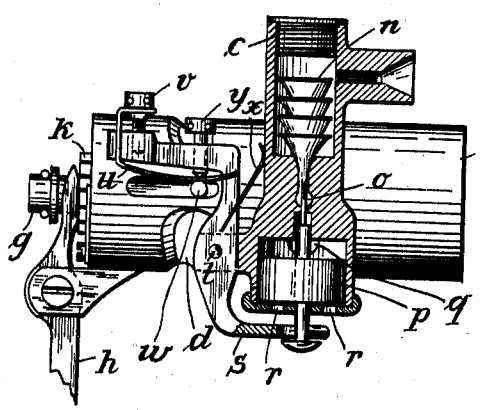
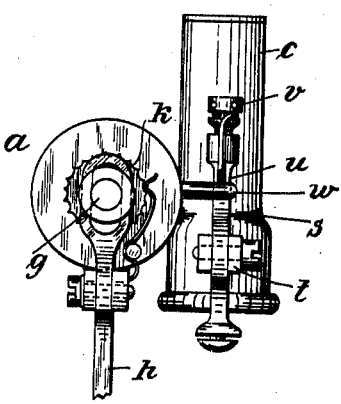
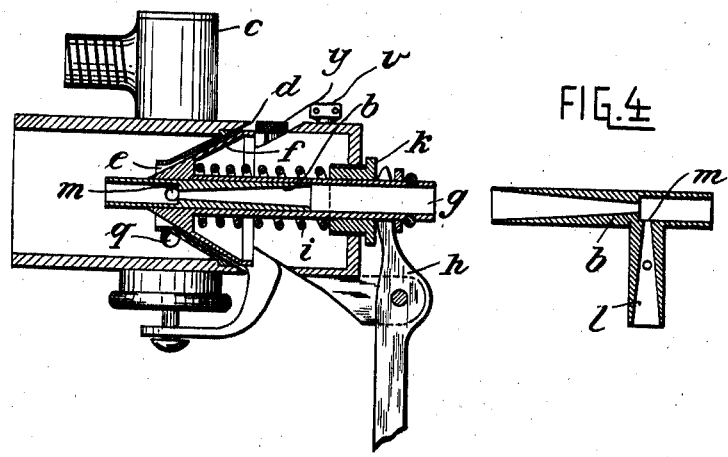
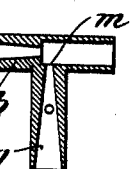
Inventor:
Leopold Podszus
per:
Dr. Adolph Zimmermann
Attorney Patented Feb. 11, 1930

1,746,361

UNITED STATES PATENT OFFICE

LEOPOLD PODSZUS, OF BERLIN-CHARLOTTENBURG, GERMANY

CARBURETOR

Application filed May 5, 1925, Serial No. 28,150, and in Germany July 9, 1924.

This invention has reference to improvements in carburetors for fuel-fed motor engines, and it particularly refers to engines of that kind in which the admission of the fuel is controlled without the use of a float and merely by means of a valve or the like to be operated by a plunger or air-pressure piston, and in which the fuel is atomized by the aspirated air current. Among other important objects and advantages of this invention, which will appear from the specification, and from an inspection of the drawings it is one of the main objects of my invention to produce the necessary proper ratio of the admission of fuel and of the amount of air to correspond to the actual requirements of the power or load it is intended to produce, and it is a further object of this invention to provide simple and efficient means to adjust the valve for idle motion, and furthermore, to provide as simple and uncomplicated means as possible for these and other purposes. In view thereof in the practice of my invention I may connect the air admission valve to the fuel admission valve by positive means and in such a manner that the fuel admission valve is adapted to be opened for an increased amount of charge upon an increase of the rate of admission of air only. Moreover, this connection may be so arranged and adjusted that in the case of idle movement the fuel and the air are admitted only at the ratio required for the purpose.

My invention will be more fully described with reference to the accompanying drawing, showing by way of example a form of embodiment of the principles of my invention and wherein Figure 1 is a side view with the fuel admission valve in section; Figure 2 is a front view and Figure 3 a side view with air admission valve in section and Figure 4 shows the injector nozzle.

The air admission valve body $a$ or mixing chamber is connected by its open side to the suction side of the engine, and adjacent thereto and at right angles to said valve body the valve body $c$ for the mounting of the fuel admitting means, a stepped valve $n$ for instance is arranged, and connected thereto by the injector nozzle $b$ which is disposed in the interior of the displaceable air-admitting tube $g$ and lengthwise thereof. The air admission valve body $a$ is provided with an almost annularly arranged air admission slot $d$ to which a conical valve seat $e$ is connected at the engine side of the valve. The air valve $f$ is connected by the tube $g$ to one of the arms of a two-armed steering or controlling valve $h$, disposed at the outside of the valve body, and a helical spring $i$ serves to force the air valve against its seat $e$. A set screw $k$ in the bottom part of the valve body $a$ allows of a delicate adjustment of the air valve for the amount of air required in the idle or starting motion of the engine. Within the valve-tube $g$ and the valve $f$ the injector $b$ is disposed, the side arm $l$ of which receives the fuel at the point $m$ of the injector nozzle from the fuel valve body $c$, the fuel being atomized at the point $m$ by means of the air current aspirated from the outside through the tube $g$ and being introduced through the short tube $m$ into the chamber or air admission valve body $a$ where it becomes mixed with the air introduced from the tube $g$ and the secondary air entering by way of the valve body $f$ through the slot $e$.

In the upper part of the fuel valve body the fuel valve or fuel regulating means $n$ is disposed within a cylindrical space, and is supported upon the plunger or steering and controlling piston $p$ by means of the connecting rod $o$ and in such a manner that the valve is seated and is in the closing position with relation to the admission of fuel, when the piston $p$ has assumed its lowest position. For the purpose of actuating the steering piston $p$ it is connected at its top through a port or communicating conduit $q$ to the chamber of the air valve body $a$ which is open to the aspiration of the engine, while the bottom part of the piston by means of the openings $r$ is under atmospheric pressure. In accordance with the strength of the aspirating draft the steering piston $p$ is raised more or less by the atmospheric pressure acting against its under surface, causing the consequent raising of the fuel valve $n$.

In order to adjust the admission of fuel in accordance with the amount of air admitted, the steering or controlling piston $p$ for the fuel valve $n$ is connected to a bell-crank or two-armed lever $s$ fulcrumed at the bolt or pivot $t$. Upon the lower side of the upper arm of the lever $s$ a cam shaped slide-way $u$ is arranged which may be formed by a piece of steel wire which admits of different adjustment by means of the set screw $v$. The slide-way $u$ rests upon a pin $w$ rigildy connected to the air admission valve $f$, and projecting through a slot in the air-valve body $a$. In accordance with the air valve $f$ being outwardly moved more or less by the lever $h$, the lever $s$ is free to be rotated in accordance with the position of the pin $w$, which results in moving the piston $p$ and the fuel valve $n$ into the opening position. A spring $x$ attached to the upper arm of the lever $s$ imparts such a rotation thereto that the cam $u$ is always in engagement with the pin $w$. A set screw $y$ disposed at the upper arm of the lever $s$ and housed in the upper angular and substantially horizontal extension of said arm may project through said extension and serves for the adjustment of the admission of fuel during the idle motion of the engine, that is to say, when starting the engine, while the air-valve $f$ is still closed. The said set-screw $y$ projects through the angularly disposed arm of the rocking lever $s$ and bears upon the spring $u$, so as to impart a certain initial position to said lever $s$ and to swing it in the clockwise direction in the idle or starting position of the engine, while, when the screw $y$ is raised, the lever $s$ will be free to be rocked anticlockwise, so as to allow a greater range of movement to the plunger $p$ which thereby, even in the closed position of the air valve $f$ may produce an increased opening of the fuel valve $n$. The set screw $y$ therefore operates as a setting means for the fuel-admitting means. The air valve $f$ for the operation of the engine under load or while on travel therefore serves also for the adjustment of the admission of fuel and of air during idle motion.

The mode of operation of the device is substantially as follows: The carburetor is first adjusted for idle motion, which is effected by operating the set screw $y$ for the admission of fuel. The more this screw $y$ is lowered, the less the piston $p$ and the fuel valve $n$ will be raised or opened, so that there is the possibility for the fuel valve $n$ to open somewhat even when the air admission valve $f$ is closed. The aspirated air will first pass through the injector. In case the air thus aspirated should not suffice for the power required during idle motion the air valve $f$ is opened somewhat by means of the set screw $k$, in order to admit additional air.

When the machine is required to produce power for travel or the like, the lever $h$ is moved in such a manner that the air admission valve $f$ is raised from its seat $e$, thereby admitting additional air through the slot $d$. Together with the valve $f$ the pin $w$ is also moved to the rear and passes along the cam face $u$; this causes the lever $s$ to be turned anti-clockwise, thereby allowing more play for the operation of the piston $p$. The rotation of the lever $s$ is governed by the adjustment of the cam face $u$ by means of the set-screw $v$.

In the position of rest the fuel valve $n$ is always closed, and is only opened, when a vacuum action occurs.

The valve $n$ for the admission of fuel is preferably provided with annular grooves, adapted to cause a regulation and reduction of the rate of admission of fuel, and to balance the fluctuations in the admission of fuel.

It should be understood that the invention may find expression in many other embodiments, and that it is susceptible of modifications in various particulars to better adapt the same to varying conditions of application, the salient features not being dependent on the particular form of construction herein shown and described by way of exemplification, except as stated in the claims hereunto appended. The invention may be used in connection with automobile vehicles, but it is not restricted to such application.

I claim:—

1. In a carburetor in combination, air admitting means and fuel admitting means substantially adjacent thereto, adjusting means for the fuel admitting means, a regulating lever engageable with the fuel admitting means, a flexible guiding member, displaceably disposed on said lever and engageable with the air admitting means, a set screw on said lever and engageable with the guide member, and adapted to vary the configuration of the guiding member and its distance from said regulating lever.

2. In a carburetor in combination, a mixing chamber, an apertured wall portion on said chamber, an endwise open air-admitting tube mounted for axial displacement within said chamber, air-admitting and controlling means mounted upon said tube, and engageable with said apertured portion, and controlling the admission of air into the mixing chamber through said apertured portion, fuel admitting means communicating with the interior of said tube, regulating means for the fuel-admitting means, and setting means for said regulating means, slidingly engageable therewith and with the air admitting and controlling means.

3. In a carburetor in combination, a mixing chamber, an apertured wall portion on said chamber, an endwise open air-admitting tube, axially and displaceably mounted within said chamber, air admitting and controlling means upon said tube engageable with the apertured portion, a fuel injection nozzle within said tube and lengthwise thereof, fuel admitting means communicating with said nozzle, regulating means for the fuel-admitting means, a setting and adjusting lever, loosely engageable with the air-admitting tube and with the regulating means.

4. In a carburetor in combination, a mixing chamber, an apertured wall portion on said chamber, an endwise open air-admitting tube, axially and centrally and displaceably mounted within said chamber, an air-admitting and controlling valve on said tube, engageable with the apertured wall portion, fuel injecting means within the air-admitting tube, fuel-admitting means laterally disposed and communicating with the fuel-injecting means, suction-influenced regulating means engaging the fuel-admitting means, and a setting and adjusting lever, loosely engageable with the regulating means and with the air-admitting tube.

5. In a carburetor in combination, air-admitting means and fuel-admitting means adjacent thereto and communicating with each other, a two-armed controlling and adjusting lever, a flexible cam-face on one arm of said lever supported on the air admitting means, stopping means on the other arm of said lever, loosely engageable with the fuel admitting means, and means adapted for moving the air-admitting means and the fuel-admitting means relatively to each other.

6. In a carburetor in combination, air-admitting means and fuel-admitting means adjacent each other and communicating with each other, a suction-influenced plunger engaging the fuel-admitting means, a two-armed regulating lever, rockingly disposed outside of the plunger, a regulatable flexible cam-face on one arm of said lever supported on the air-admitting means, and separate setting means engaging the cam-bearing lever-arm, stopping means on the other arm of the lever, loosely engageable with the plunger, and regulating means for the air-admitting means.

7. In a carburetor in combination, air-admitting means and fuel-admitting means communicating with each other, a suction-influenced plunger in engagement with the fuel-admitting means, regulating means for the air-admitting means, a rockingly disposed two-armed regulating lever, angularly arranged extensions on said lever, a flexible cam-face on the extension of one lever-arm and engageable with the regulating means for the air-admitting means, a projection on said plunger, and stopping means on the angular extension of the other lever arm within the path of said projection and adapted to control the movement and adjustment of the plunger and of the fuel-admitting means, and setting means for the flexible cam-face.

8. In a carburetor in combination, a laterally apertured mixing chamber, closed at one of its ends, an endwise open air admitting tube mounted in the closed end of the chamber and axially displaceable in the chamber and spaced from the walls thereof, spring actuated operating means for said tube, an air valve secured to said tube and engageable with the lateral apertured part of the mixing chamber, a seat for said valve at the inside of the mixing chamber, an injection nozzle within said tube communicating with the open ends thereof, fuel-admitting means on said nozzle and at an angle with relation thereto, fuel-regulating means cooperating with the fuel-admitting means, steering and controlling means for the fuel regulating means, exposed to the atmosphere and a communicating conduit between said steering and controlling means and the mixing chamber, and an adjusting lever rockingly disposed outside of said chamber engageable with the air valve and adjustable by the position of said valve and loosely engageable with the steering and controlling means for the fuel-regulating means.

L. PODSZUS.